United States Patent [19]
Markovic

[11] Patent Number: 4,799,698
[45] Date of Patent: Jan. 24, 1989

[54] AUXILIARY SUPPORT FOR THE TRANSPORT OF CAR TRAILERS OR TRUCK TRAILERS

[76] Inventor: Zdravko Markovic, Liegnitzer Strasse 6, D-8058 Erding, Fed. Rep. of Germany

[21] Appl. No.: 19,280

[22] PCT Filed: Jun. 24, 1986

[86] PCT No.: PCT/EP86/00365
§ 371 Date: Feb. 27, 1987
§ 102(e) Date: Feb. 27, 1987

[87] PCT Pub. No.: WO87/00132
PCT Pub. Date: Jan. 15, 1987

[30] Foreign Application Priority Data

Jul. 3, 1985 [DE] Fed. Rep. of Germany ....... 3523716

[51] Int. Cl.⁴ .............................................. B62B 1/08
[52] U.S. Cl. .......................................... 280/46; 280/3; 180/19.1; 180/209
[58] Field of Search ...................... 280/3, 46; 180/209, 180/19.1; 254/93 H, 126

[56] References Cited

U.S. PATENT DOCUMENTS

| | | | |
|---|---|---|---|
| 2,093,392 | 9/1937 | Qualye | 280/46 |
| 2,622,891 | 12/1952 | Knapp | 280/476 R |
| 2,639,785 | 5/1953 | Vickers | 180/209 |
| 2,812,951 | 11/1957 | Hanson | 280/46 |
| 3,166,141 | 1/1965 | Shields | 180/19.1 |
| 3,179,196 | 4/1965 | Richardson | 180/14.1 |
| 3,298,705 | 2/1967 | Neaverson et al. | 280/46 |
| 3,847,407 | 11/1974 | Balletto | 280/46 |
| 4,509,724 | 4/1985 | Okada | 254/126 |
| 4,641,815 | 1/1987 | Yu | 254/93 H |

FOREIGN PATENT DOCUMENTS 71-28269 3/1973 France .

Primary Examiner—David M. Mitchell
Assistant Examiner—Donn McGiehan
Attorney, Agent, or Firm—Robert W. Beach; Ward Brown

[57] ABSTRACT

An auxiliary support for moving car trailers or truck trailers is supported by wheels on an axle and has a drawbar at its front end. To facilitate connection to a trailer and prevent the auxiliary support from tilting, the auxiliary support is provided with a detachable outrigger that can be connected to the axle at the side opposite the drawbar and has a swivelling wheel.

1 Claim, 3 Drawing Sheets

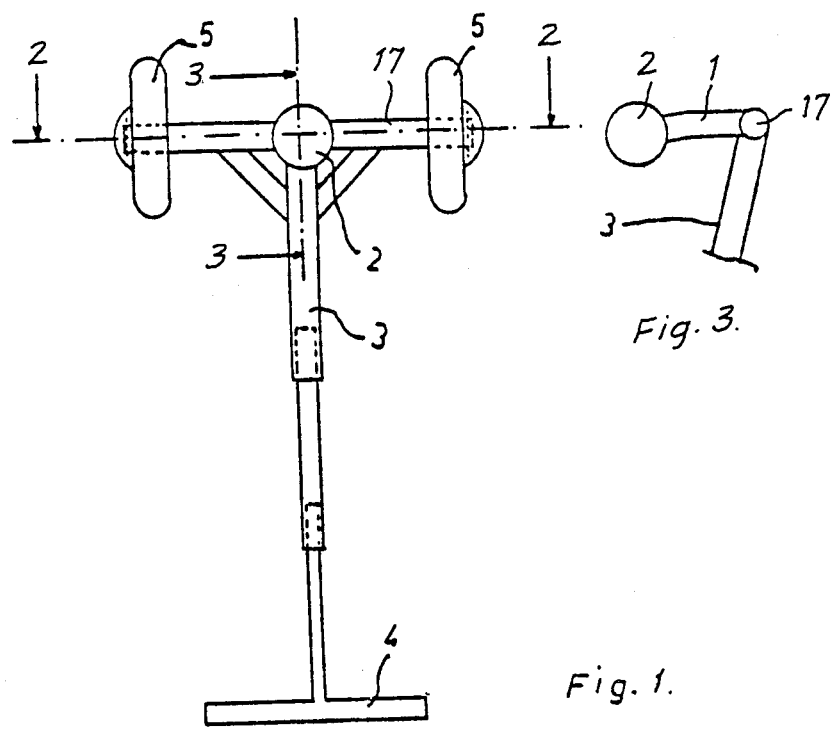

AUXILIARY SUPPORT FOR THE TRANSPORT OF CAR TRAILERS OR TRUCK TRAILERS

BACKGROUND OF THE INVENTION

1. Field of the Invention

The invention relates to an auxiliary support for the transport of car trailers or truck trailers which is mobile by having supporting wheels, has at its front end a drawbar for manual handling and propelling of the trailer and is connectable to the trailer that is to be moved.

2. Prior Art

An auxiliary support of this kind is known from U.S. Pat. No. 4,168,074. For connection to the trailer that is to be moved, this auxiliary support has a supporting rod which can be fastened with the aid of a strap to the drawbar of the trailer that is to be moved.

To use this known auxiliary support it is, therefore, necessary that on the trailer that is to be moved a corresponding fastening strap be provided on the drawbar. It is furthermore disadvantageous that this strap can scarcely prevent a lateral tilting away of the auxiliary support, since, by reason of the slight height dimensions of the drawbar of the trailer, the supporting rod of the auxiliary support is connected virtually only at a point to the drawbar.

SUMMARY OF THE INVENTION

The object of the invention consists, therefore, in providing a hand-propelled support enabling simple and easy handling accompanied by the greatest possible security against overturning of the auxiliary support.

This problem is solved by the auxiliary support having two wheels carried by an axle and arranged on opposite sides, respectively, of a hitch post carried by the axle and having a ball on its upper end for connection to the ball socket of the trailer.

An outrigger wheel is located in spaced relationship from the axle. Advantageously the outrigger wheel is arranged adjustably on the auxiliary support for shifting toward and away from the axle.

The outrigger wheel is mounted detachably on the auxiliary support and the outrigger wheel is mounted on the auxiliary support for swiveling about a perpendicular axis in all directions.

Preferably the length of the hitch post is variable pneumatically or mechanically.

BRIEF DESCRIPTION OF THE DRAWINGS

FIG. 1 is a plan of an auxiliary support.

FIG. 2 is a section of the auxiliary support taken along line 2—2 of FIG. 1.

FIG. 3 is a section through a portion of the auxiliary support taken on line 3—3 of FIG. 2.

DETAILED DESCRIPTION

Figure 4:
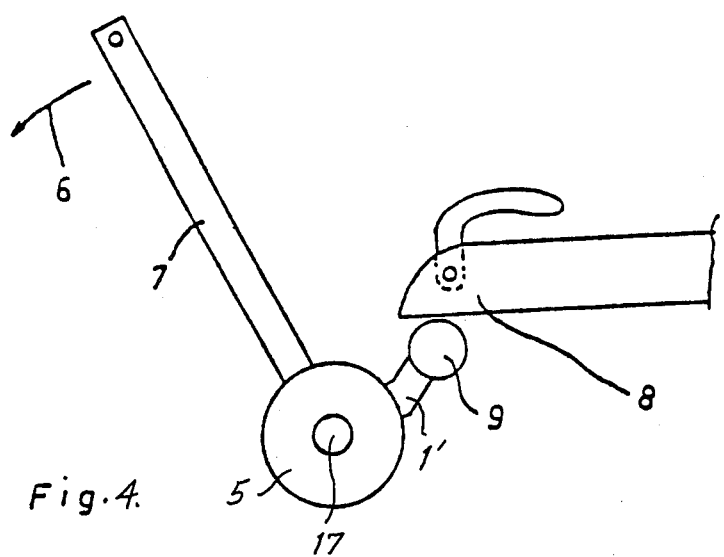
FIG. 4 is a side elevation of another embodiment of the auxiliary support and FIG. 5 is a similar view showing the auxiliary support equipped with an outrigger wheel.

In accordance with FIGS. 1 to 3, an auxiliary support has an axle 17, on the opposite ends of which two wheels 5 are rotatably mounted, respectively. A drawbar 3 is connected to the axle. In the case of the FIG. 4 embodiment the drawbar 7 is of fixed length, whilst in the embodiment of FIG. 1 the length of the drawbar 3 is adjustable. The end of drawbar 3 remote from axle 17 carries a handle 4 for pulling the auxiliary support.

As FIGS. 1 to 3 further show, a hitch post 1 projects upward from the central portion of the axle 17 and has mounted on its upper end a ball 2 for connection to the ball socket of a trailer.

As FIG. 4 more especially shows, for attaching the auxiliary support to a trailer, the drawbar 7 is swung upwardly in the direction opposite to the arrow designated 6, so that the ball 9 mounted on the upper end of the post 1' can be pushed manually under the ball socket 8 of the trailer (not shown). By swinging the drawbar in the direction designated by the arrow 6, the ball 9 is fitted into the ball socket 8, so that the trailer can be hand-propelled by pulling and pushing on the drawbar 7.

Figure 5:
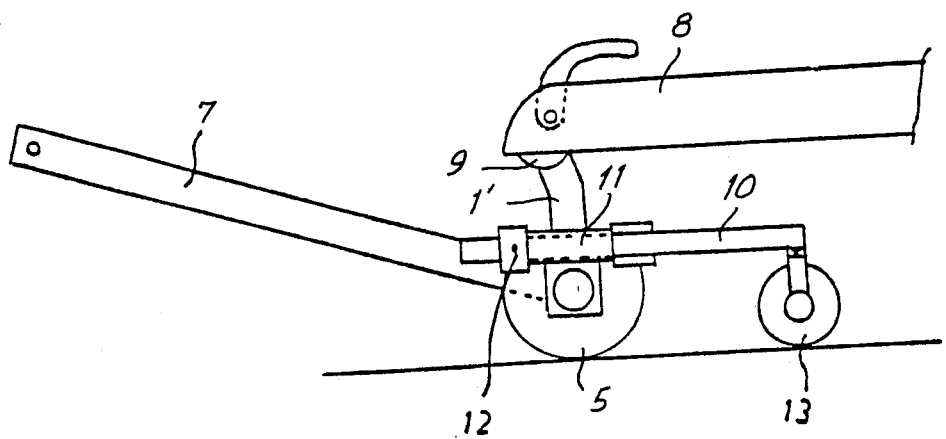

The auxiliary support shown in FIG. 4, can be equipped with an outrigger wheel 13 shown in FIG. 5, which is connected to the auxiliary support at the side of the axle 17 opposite drawbar 7, in any of various positions spaced different distances from the axle and securable in a selected adjusted position by a setscrew 12. Such setscrew will anchor the outrigger arm 10 carrying wheel 13 in a mounting sleeve 11 carried by the axle 17. This outrigger wheel 13 and its arm 10 are detachable from the auxiliary support sleeve 11 by loosening the setscrew 12. Furthermore, the outrigger wheel 13 is mounted on arm 10 to swivel about an upright or perpendicular axis in all directions so as not to interfere with sidewise swinging of drawbar 7 whether the operator is pulling or pushing on the drawbar.

In use of the outrigger support, with the setscrew 12 loosened and the outrigger wheel 13 and arm 11 removed, the auxiliary support hitch post 1' is pushed under a trailer drawbar in the manner shown in FIG. 4 and the drawbar 7 is swung down from the position shown in FIG. 4 to engage the ball 9 with the trailer ball socket 8. The outrigger wheel attachment can then be put in place by sliding arm 10 into sleeve 11 as shown in FIG. 5 and securing it by tightening setscrew 12. The trailer (not shown) can then be hand-propelled by pulling and pushing on the drawbar 7.

Figure 6:
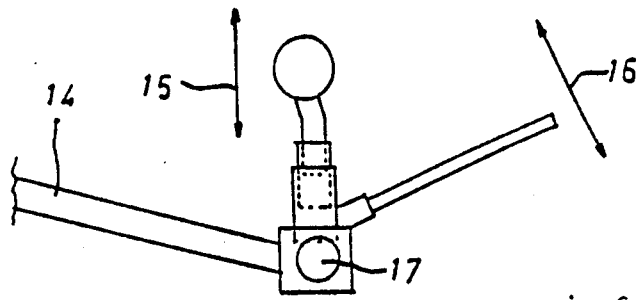
FIG. 6 is a side elevation of an auxiliary support with a hydraulically adjustable length hitch post, parts being broken away.
Figure 7:
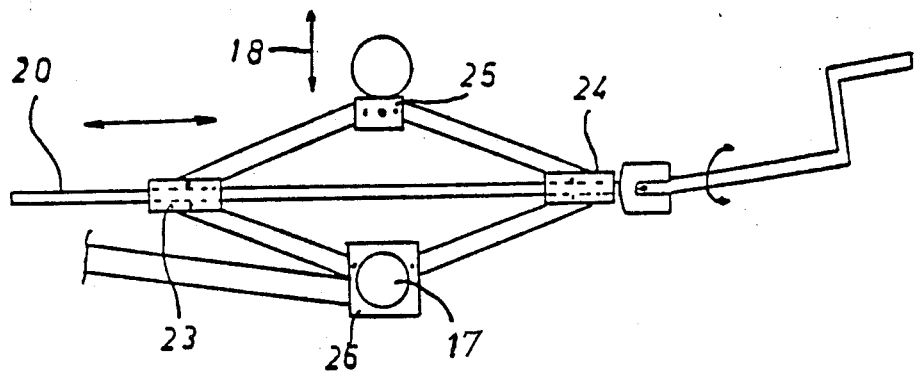
FIG. 7 is a side elevation of an auxiliary support with a mechanically adjustable length hitch post, parts being broken away.

In the embodiment of the auxiliary support shown in FIG. 6, the height of the hitch post is adjustable hydraulically in relation to the axle 17 in the direction indicated by the double-arrows 15. In the embodiment of the auxiliary support shown in FIG. 6, the strut structure is mechanically adjustable in effective height in relation to the axle 17, as indicated by the double-arrows 18, by a quadrilateral parallel linkage or pantograph linkage deformable by a turnbuckle screw connecting opposite apexes 23 and 24 to contract the parallel linkage horizontally for extending such linkage elevationally. In this way the height of the hitch post can in each case be adapted to the trailer that is to be moved.

I claim:

1. An auxiliary wheeled support for the transport of automobile trailers or truck trailers comprising an axle, axle-supporting wheels mounted respectively on opposite ends of said axle, a drawbar connected to said axle for effecting hand-propelled movement of the wheeled support over the ground, hitch post means mounted on said axle between said wheels for engagement with the hitch of a trailer to be moved, outrigger wheeled stabilizing means located at the side of said axle opposite said drawbar, having only a single ground-engaging wheel which is mounted for swiveling about an upright axis and rigidly connected to said axle for preventing tilting of said axle about the axis of said axle, and means connecting said outrigger wheel stabilizing means to said axle for enabling the degree of spacing between said outrigger wheeled stabilizing means and said axle to be adjusted or for detaching said outrigger wheeled stabilizing means from the axle at will to enable said drawbar to be tilted for tilting said hitch post means into engagement with or disengagement from the trailer hitch.

* * * * *